US009813482B2

(12) United States Patent
Heeter et al.

(10) Patent No.: US 9,813,482 B2
(45) Date of Patent: Nov. 7, 2017

(54) REMOTE PROCESS MANAGEMENT

(71) Applicant: MICROSOFT CORPORATION, Redmond, WA (US)

(72) Inventors: Ross David Heeter, Seattle, WA (US); Jason Robert Tuck, Kirkland, WA (US); Cyrus Kanga, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 516 days.

(21) Appl. No.: 14/318,892

(22) Filed: Jun. 30, 2014

(65) Prior Publication Data
US 2015/0378576 A1    Dec. 31, 2015

(51) Int. Cl.
H04L 29/08 (2006.01)
H04L 29/06 (2006.01)
H04M 1/725 (2006.01)
H04N 21/414 (2011.01)
H04N 21/422 (2011.01)
H04N 21/485 (2011.01)
H04N 21/488 (2011.01)

(52) U.S. Cl.
CPC ............ *H04L 67/025* (2013.01); *H04L 67/38* (2013.01); *H04M 1/72533* (2013.01); *H04N 21/41407* (2013.01); *H04N 21/42208* (2013.01); *H04N 21/42224* (2013.01); *H04N 21/4858* (2013.01); *H04N 21/4884* (2013.01)

(58) Field of Classification Search
CPC ....... G06F 3/0484; G06F 3/0482; H04L 29/08
See application file for complete search history.

(56) References Cited

U.S. PATENT DOCUMENTS

| 5,867,156 A | 2/1999 | Beard et al. | |
|---|---|---|---|
| 8,953,099 B2* | 2/2015 | Kwak | H04N 5/4403 340/12.22 |
| 2010/0235740 A1* | 9/2010 | Friedlander | H04N 5/44513 715/716 |
| 2012/0044061 A1* | 2/2012 | Sakai | G08C 17/00 340/12.5 |
| 2012/0210349 A1 | 8/2012 | Campana et al. | |
| 2013/0141331 A1* | 6/2013 | Shiu | G09G 5/003 345/158 |
| 2014/0218289 A1* | 8/2014 | Dai | H04M 1/72533 345/157 |
| 2015/0309669 A1* | 10/2015 | Wheeler | G06F 3/0482 715/716 |

(Continued)

OTHER PUBLICATIONS

How to Tabcast with Google Chromecast—Feb. 10, 2014.*

(Continued)

*Primary Examiner* — David Choi
(74) *Attorney, Agent, or Firm* — Shook, Hardy & Bacon L.L.P.

(57) ABSTRACT

Embodiments of the present invention provide a process-management interface on a companion device that allows a user to control characteristics of an application running on a primary device. The interface can change a size or position of a viewport and change the primary device's control focus to or away from viewport. The process-management interface also allows a user to target a process on the companion device.

15 Claims, 15 Drawing Sheets

(56) References Cited

U.S. PATENT DOCUMENTS

| | | | | |
|---|---|---|---|---|
| 2015/0309670 | A1* | 10/2015 | Wheeler | G06F 3/0482 715/716 |
| 2015/0378576 | A1* | 12/2015 | Heeter | H04L 67/025 715/740 |

OTHER PUBLICATIONS

"Apple TV and AirPlay Fuel Rise of Dual-Screen Apps", Published on: Feb. 29, 2012, Available at: https://codeontime.com/blog/2012/02/automated-translation.

Heath, Alex, "Apple TV Hacked to Run App Store Apps, What It Means for Developers", Published on: Jan. 1, 2012, Available at: http://www.cultofmac.com/137468/apple-tv-hacked-to-run-app-store-apps-what-it-means-for-developers-interview/.

"Second-Screen Applications", Published on: Jun. 7, 2012, Available at: https://developers.google.com/tv/remote/?hl=pt-PT.

Murphy, David, "Windows 8 and Xbox: How to Realize their Hidden Synergy", Published on: Jan. 24, 2013, Available at: Http://Www.Pcworld.Com/Article/2025407/Windows-8-And-Xbox-How-To-Realize-Their-Hidden-Synergy.Html.

Scharr, Jill, "How to Use Xbox One Snap", Published on: Nov. 22, 2013, Available at: http://www.tomsguide.com/us/xbox-one-howto-snap,news-17890.html.

Cha, Bonnie, "Five Tips and Tricks for Getting the Most Out of Your Xbox One", Published on: Jan. 16, 2014, Available at: http://recode.net/2014/01/16/five-tips-and-tricks-for-getting-the-most-out-of-your-xbox-one/.

"Hurl", Published on: Dec. 24, 1997, Available at: http://www.hurl.net/.

Wong, Raymond, "Microsoft updates Android Xbox SmartGlass app for 7-inch tablets", Published on: Nov. 30, 2012, Available at: http://bgr.com/2012/11/30/xbox-smartglass-android-app-7-inch-tablet-support-microsoft/.

\* cited by examiner ns, ###

REMOTE PROCESS MANAGEMENT

BACKGROUND

Increasingly, televisions are used to display interactive content. For example, primary devices such as game consoles, digital video recorders (DVR), and the televisions will present web browser interfaces and media selection interfaces that can require complex navigation. In particular, these interfaces may require a user to scroll various selectable objects and to select an object. The interfaces may also require textual input.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the present invention may be directed to a method of using a companion device to control a process running on a primary device. The method can comprise outputting for display on the companion device, a process-management interface that identifies a media application running on the primary device. The process-management interface can comprise a size control that allows a user to specify a size of a media application's viewport on a primary device's display. The method further comprises receiving, at the companion device, a user interaction with the size control specifying a new size for the media application's viewport. The method also comprises communicating, from the companion device to the primary device, a command carrying instructions to change the media application's viewport to the new size.

BRIEF DESCRIPTION OF THE DRAWINGS

Embodiments of the invention are described in detail below with reference to the attached drawing figures, wherein.

DETAILED DESCRIPTION

Figure 1:
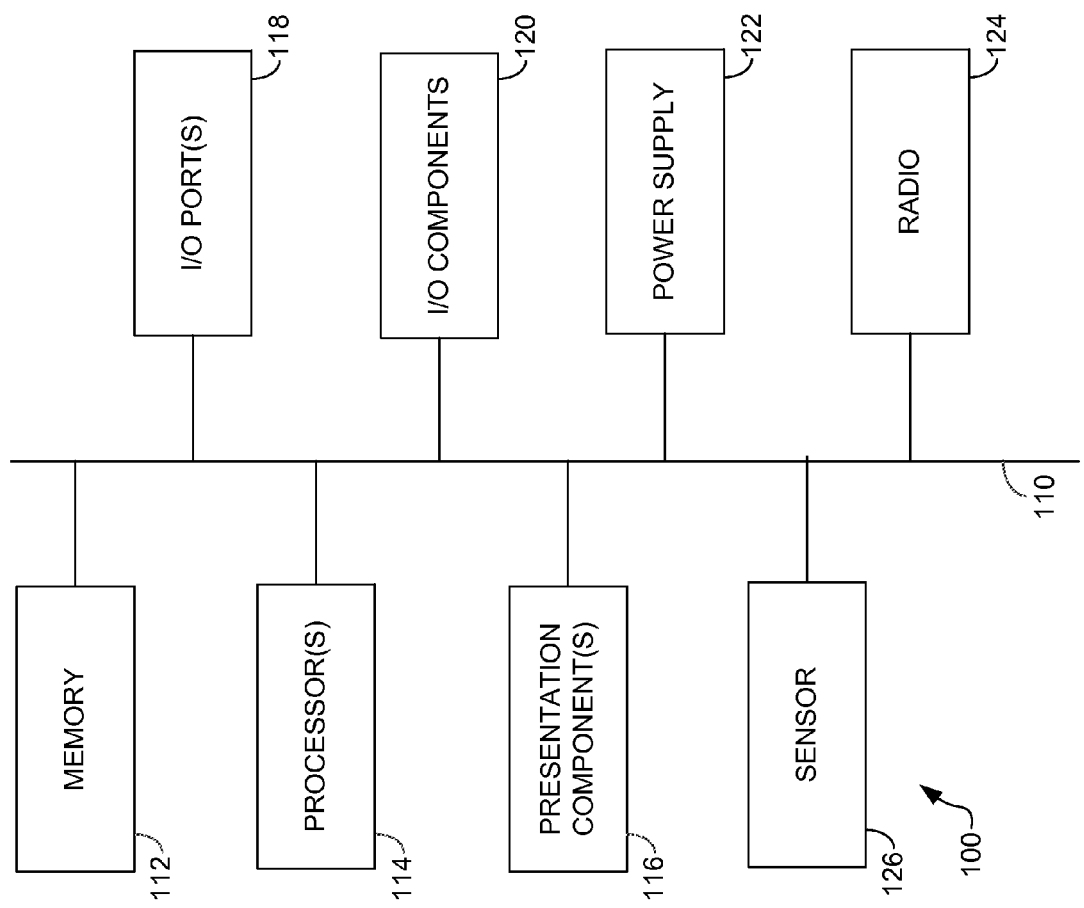
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention relate to a control application that enables a companion device to change characteristics of processes or applications running on a primary device. As used herein, a process and application may be used interchangeably. The control application allows a companion device to control view characteristics of viewports for one or more applications running on a primary device. Interfaces generated by an application can have viewports of varying sizes. For example, a viewport could consume the full screen, half a screen, or some other designated portion of a screen.

The process-management interface can change the primary device's control focus from one running application to another. In an aspect, the process-management interface can also open and close applications on the primary device. Applications can be opened with a designated viewport size and control focus.

The control application on the companion device can target a process or application to control. As used herein, the "targeting" is a state of the control application that designates a running application on the primary device for control. The targeting may be changed by the user through one or more mechanisms. For example, an interface may be provided on the companion device for the user to change the targeting among running applications. Rules may be followed automatically to initially set the targeting and change it contextually. In one aspect, state information is received from the primary device to determine what applications are running. State information can identify the media applications running on the primary device and media titles engaged by the media applications. In one aspect, the targeting persists until changed by the user. For example, the targeting may persist when control application interfaces are closed.

As used herein, a "viewport" is a portion of a display allocated to an interface generated by the application. The viewport may be an application window. The viewport can be square, rectangular, or some other shape. The viewport may run in the foreground or the background. As used herein, "foreground" means the viewport is visible. As used herein, "background" means the viewport is not visible. An application may have a visible tab, icon, tile, or other indication and still be in the background.

As used herein, a "primary device" is a computing device that includes hardware and software that enables the primary device to run multiple media applications simultaneously and output a media presentation. The primary device is a consumer device that may be located in a user's residence and is not a remote server. Exemplary primary devices include a game console, a laptop computer, a personal computer, a television, a tablet, a smartphone, a set top box, and such.

The primary device may connect to multiple output devices to create an entertainment experience for the user. For example, a game console could be connected directly or indirectly to a television through which both video and audio output are presented. A game console could also be connected to an audio receiver that outputs audio content to speakers and visual content to a television. The primary device may also have audio and visual output mechanisms, such as a screen or speakers, built in.

As used herein, a "companion device" is a computing device with hardware components and software needed to generate a visible interface and input mechanisms the user can manipulate to interact with the interface. The companion device also has the ability to communicate with the primary device. For example, the companion device may have radio hardware and software necessary to connect to a wireless router and/or form a Bluetooth connection with the primary device. Alternatively, the companion device could use a wired connect such as a USB or Ethernet connection to communicate with the primary device. Exemplary companion devices include smartphones, tablets, and tablet PCs.

As used herein, a "media application" is an application that processes digital content to generate a user experience of the content. The user experience may include audio, visual, and tactile content. Exemplary media applications include an Internet browser, an entertainment streaming application (e.g., movie or audio streaming), a DVD playing application, a game application, a broadcast TV application, and such. The DVD application can read content on a DVD and deploy the primary device's hardware and software resources to present the DVD content to the viewer. The game application is not a video game title, but an application that deploys the primary device's hardware and software to execute the game code and create the game experience for the user.

Some media applications are able to be controlled by the control application on the companion device and others are not. In an aspect, media applications that are able to be controlled are those that include an application program interface for the control application. Further, the user may be able to set preferences for whether or not an application can be controlled by the companion device. In aspects using user preferences, applications that are able to be controlled are those the user has given permission to be controlled.

As used herein, an application is in "control focus" on the primary device when the user is actively interacting with the application. The primary device uses a direct focus model that requires the user to focus on an application to manipulate the application. For example, when a user is playing a game title through the game application, then the game application is in control focus. Other applications maybe running simultaneously and be out-of-control focus. In one aspect, only a single application can be in control focus at a point in time. The control focus is different from targeting. Targeting refers to an application selected on the companion device, while control focus is the application being controlled by the primary device. The control focus and targeting could be on the same application or on different applications.

As used herein, an application is "out-of-control focus" when the application is running but is not receiving active user interaction through the primary device. An application that is closed would not be running, and thus not out-of-control focus.

The control focus may be set upon opening the active-application interface by following one or more rules. For example, a user can establish a preferred default control focus on the companion device through a menu provided by the active-application interface. In another example, the control focus could initially be set to the first application open on the companion device during a user session.

In one aspect, the control focus on the companion device is changed upon determining that the application having the present control focus is closed. In one aspect, upon determining that the application having the control focus is closed, the control focus is automatically reset to whatever media application is running in a foreground mode on the primary device when the second media application was closed.

A user session may be defined as a time period of consistent interaction with the companion device. For example, the user session could terminate after user interaction with the primary device ceases for a threshold period of time. The threshold period of time can vary based on the application in the foreground on the primary device. For example, when the media title is a movie, then no user interactions may be expected during the length the movie presentation. Thus, when a movie is being presented, the threshold period of time may be the duration of the movie plus fifteen minutes. During a video game, the threshold time could be ten minutes from the last interaction.

In one aspect, the primary device is coupled to a camera with a view of the presentation area. The presentation area is an area of a room in which users can view the media presentation provided by the primary device. For example, people sitting on a couch in front of a television could be in the presentation area. In one aspect, the user session bounds are determined by the presence or absence of people in the presentation area by analyzing visual data received from the camera. A user session may start when the users enter the room and terminate when the users leave the room.

In one aspect, the primary device determines when a user session is ongoing and provides user session information to the companion device.

As used herein, to "engage" with a media title means to read the content of the media title and take steps to generate a user experience of the media title. Engaging can include executing computer code. For example, engaging with a video game requires the game application to execute the video game title's code. In the case of a movie or audio file, engaging may include reading the content of a file and processing the content to generate an experience. The media application can be engaged with a media title even when a user experience is not presently being generated. For example, an audio application is engaged with a song title when the song is paused. Similarly, an Internet browser can be engaged with a webpage when the user is not viewing the webpage, so long as the Internet browser is active.

A media application is active when processes associated with the media application are running. The media application can be active and not engaged with a media title. For example, a user can open a video application but not select a video for presentation. In this state, the video application is active, but not engaged. The video application could be minimized, hidden, or otherwise not prominently displayed and still be active. After closing or terminating the video application, the video application would not be active.

The media titles are the entertainment content presented in the user experience. Different media applications can engage with different types of media titles. For example, an audio player may engage with songs in an MP3 format. A movie streaming application may receive a rendered video image of a movie title through a network connection.

As used herein, a "virtual control" is a software generated control. The virtual control is not a dedicated hardware control such as a volume button, knob, or similar. In one aspect, the virtual control is displayed on a touch screen and can be manipulated through the touch screen. For example, a contact on the touch screen corresponding to a location where the virtual control is displayed may constitute pressing the virtual control. Additional touch screen interactions with the virtual control are possible. Other possible interactions with a virtual control include sliding, spinning, tapping, and such. Another example of a virtual control is a virtual keyboard.

Interactions through the primary device are distinct and separate from interactions through the companion device. For example, any touch input, audio input, visual input, or other input received by the companion device is not considered input to the primary device even when the companion device is used to control an application running on the primary device. Input to the primary device is received through controllers or input mechanisms dedicated to the primary device. For example, buttons integrated into the primary device, a gamepad connected to the primary device, a keyboard connected to the primary device, a mouse connected to the primary device, and/or a camera or other sensors connected to the primary device may all be said to be controlling the primary device. Input through these dedicated devices comprise "input to the primary device."

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, radio 124, and sensor 126. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits are receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Companion Environment

Figure 2:
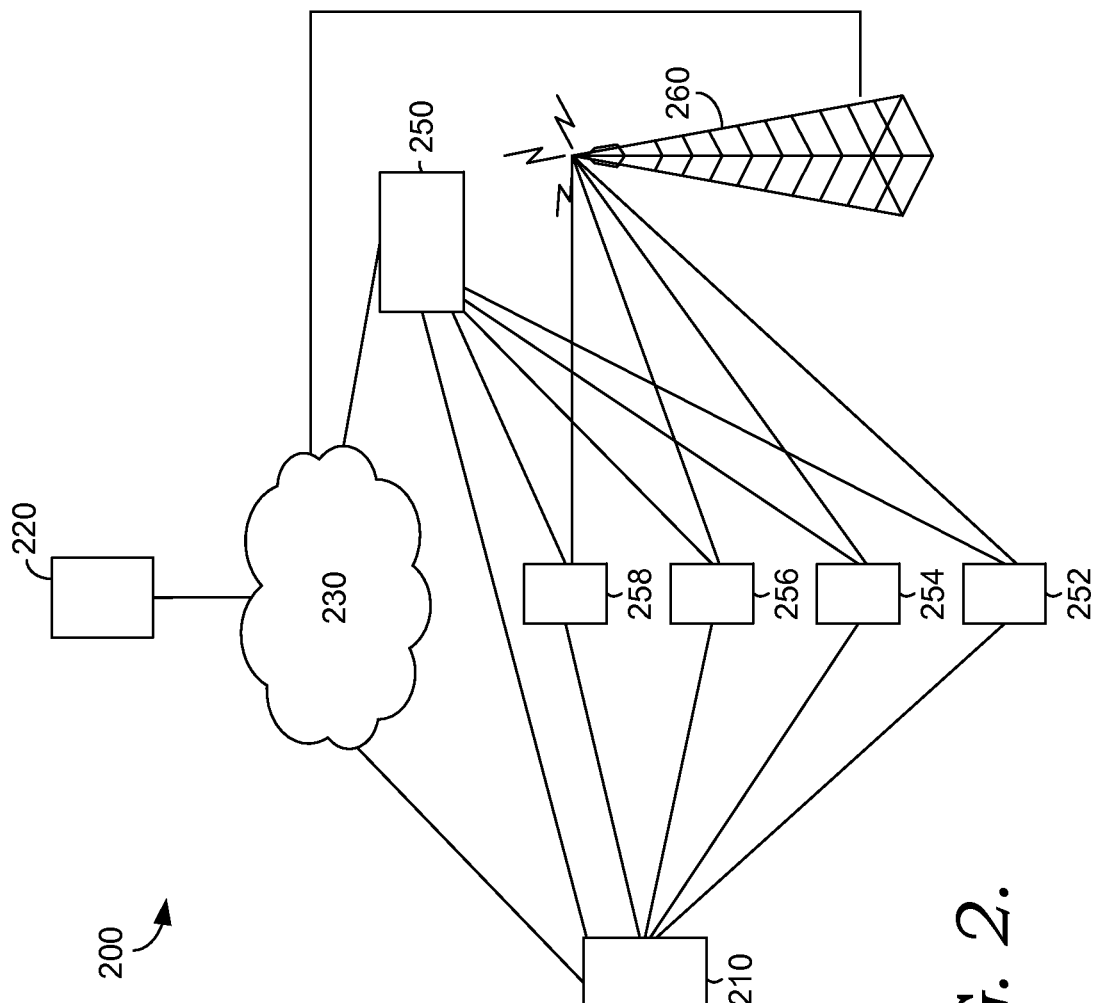
FIG. 2 is a diagram illustrating a variety of communication mediums between primary devices, online services, and companion devices, in accordance with an embodiment of the present invention.

Turning now to FIG. 2, a networked operating environment 200 comprising multiple computing devices that can provide a companion experience is shown, in accordance with embodiments of the present invention. The environment 200 includes a primary device 210, companion devices 252, 254, 256, and 258, a wireless router 250, a base station 260, a network 230 and a companion experience server 220. These devices are merely exemplary and are not intended to be limiting.

The primary device 210 may be a game console, media console, smart TV, DVD player, or other suitable computing device that presents titles. Titles may be games, movies, applications, music, videos, television shows, and other media content. The game console may be coupled to a display, such as a television.

The companion devices 252, 254, 256, and 258 are computing devices. A companion device, as used in this application, is a personal computing device that provides a second display and a control interface for applications running on the primary device. Examples include laptops, PCs, netbooks, smartphones, e-readers, PDAs, and tablets. A companion experience allows the user to interact with media applications running on a primary device 210 through interfaces on the companion device.

The companion experience server 220 can facilitate companion experiences by providing companion content, companion applications, registering and authenticating companion devices, facilitating communications between primary devices and companion devices, and performing other tasks. The companion experience server may be accessed via a wide-area network, such as the Internet. The companion experience server 220 can be omitted from some aspects of the present invention.

The companion devices 252, 254, 256, and 258 may communicate directly with the primary device 210 via Bluetooth, WiFi, or through another available interface. The companion devices could also communicate over a local wireless network generated by the wireless router 250. These connections could remain within a local area network "LAN" or they could be routed through the companion experience server 220. An exemplary LAN may be set up within a residence. The companion devices could also communicate with the primary device via a data service facilitated by base station 260. The base station 260 could route communications to the primary device 210 through whatever communication to the network 230 the primary device is using. The base station 260 could also be in direct communication with the primary device 210, if the primary device is using the same data service.

FIG. 2 shows multiple companion devices connecting to a single primary device 210. Though not shown, another exemplary computing environment could include multiple primary devices connecting to a single companion device. Alternatively, an exemplary computing environment could include multiple companion devices connecting to multiple primary devices.

Communication Session Between Primary Device and Companion Device

Figure 3:
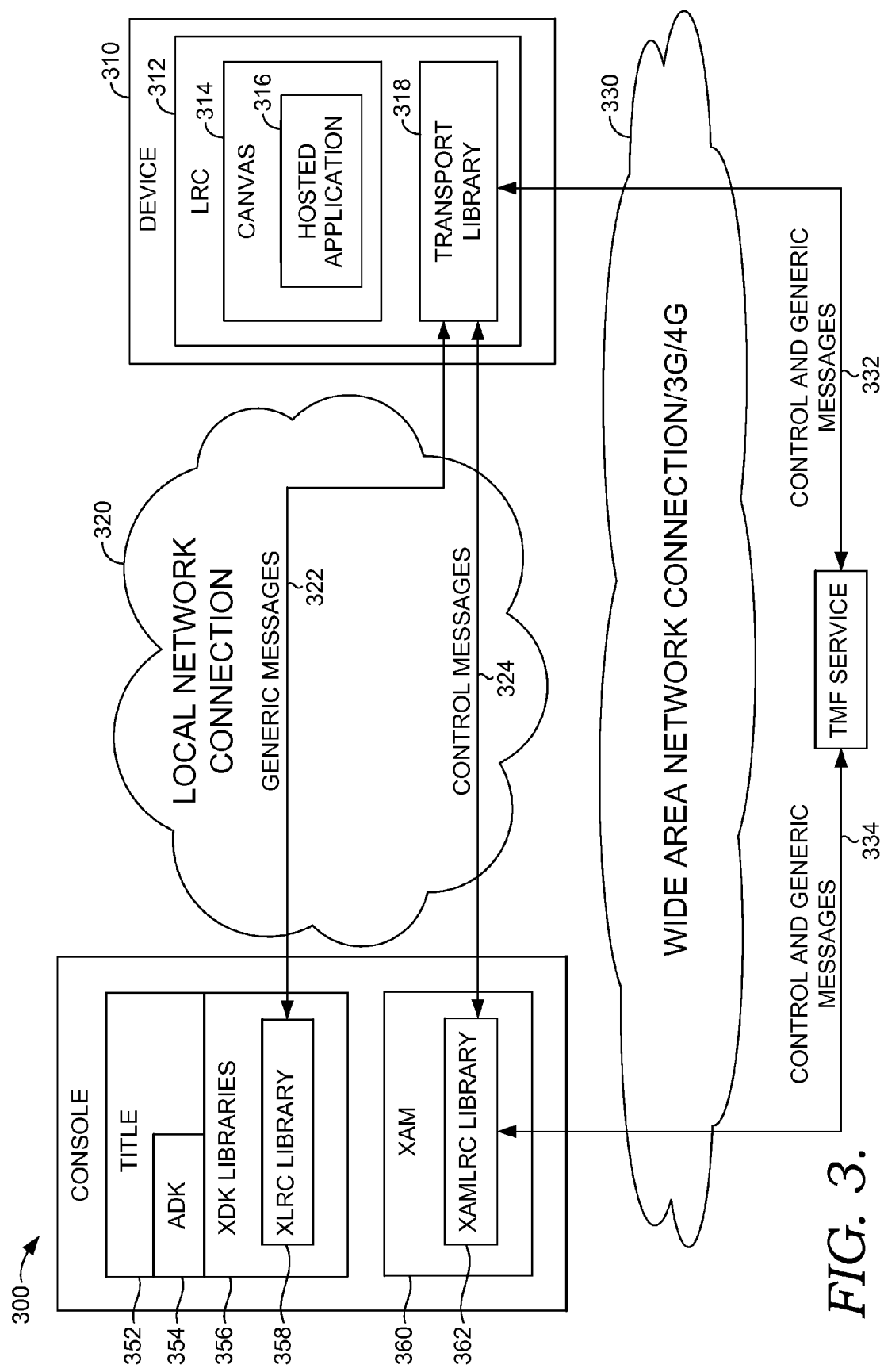
FIG. 3 is a diagram of a computing system architecture for generic messaging between a primary device and a companion device, in accordance with an embodiment of the present invention.

Turning now to FIG. 3, an exemplary diagram 300 is illustrated for generic companion-messaging between a device 310 and a console 350, in accordance with an embodiment of the present invention. The device 310 includes the LRC 312, the canvas 314, hosted application 316, and transport library 318. The console 350 includes the title 352, ADK 354, XDK libraries 356, XLrc library 358, XAM 360, and XAMLRC library 362. The title 352 may include console-based games and applications—written using either the XDK 356 or ADK 354. The ADK 354 is the console's application development kit. The XDK 356 is the console's development toolkit and includes the XLRC 358, which is the XDK 356 title library that implements the LRC 312 functionality and APIs. The XAM 360 is the system services and includes the XAMLRC 362 library that implements LRC 312 functionality and APIs. The XLrc library 358 refers to a console 350 (e.g. XBOX®) provided by Microsoft Corporation of Redmond, Wash.) developer toolkit ("XDK") title library that titles need to link against to enable companion functionality. Canvas 314 is the container for hosting, title specific, hosted applications. The hosted application 316 may be a HTML5 page and its dependent CSS and JavaScript files, hosted on the developer's servers. Lastly, Transport library 318 includes both the existing TMF proxy for sending generic messages 322 and control messages 324 to support generic companion-messaging.

The components of the console 350 and the device 310 can provide an encrypted, communication channel between a title running on the console 350 and the LRC hosted application 316. The LRC 312 may also make use of the channel. The channel supports bidirectional, message-based communication with several delivery options: reliable, unreliable, and unreliable multicast/broadcast. Communication using this channel may be routed over the local network connection whenever possible on a per device basis. When the device 310 cannot connect directly to the console 350 over the local network connection, messages are delivered through a cloud-based service TMF service 340 in FIG. 3. Titles and hosted applications can determine from per-client data whether their connection is local, implying low latency. Embodiments support simultaneously connection of multiple companion platforms to the console 350 at any given point in time, regardless if they connected over the local network connection or through the TMF service 340. A hosted application may be a web based application loaded in an embedded browser that adds companion experiences to console based titles.

The generic companion-messaging session, automatically pairs a hosted application 316 on the companion platform with a title 352 on the console 350 based on a generic companion-messaging abstraction layer that facilitates platform-independent communication between the hosted application 316 and the title. Generic companion-messaging requires special codes to the console system services library ("XamLrc"), the title library that implements LRC functionality and APIs ("XLrc"), and the LRC Transport libraries. In one embodiments, the current XamLrc library is expanded to support multiple, connected devices over TCP. In another embodiment, only UDP is used with added reliability. In another embodiment, all code related to generic companion-messaging runs in the console system services ("XAM"), which would enable for easier protocol upgrades as there would be no generic companion-messaging protocol specific code running in title space. In another embodiment, the generic companion-messaging codebase is moved into the base platform-side API (e.g., XLrc library) running in title space. The abstraction layer also particularly supports the HTML Canvas 314; Canvas 314 is the container for hosting, title specific, hosted applications. The companion platform-side API provides abstraction for the generic companion-messaging to support dynamic scriptable rendering on the hosted application. The hosted application 316 may be a HTML5 page and its dependent CSS and JavaScript files, hosted on the developer's servers. The canvas is a companion platform control encapsulating the web browser control, JavaScript bridge, and object model exposed through the bridge to the HTML5 hosted in the control.

As part of the implementation of generic companion-messaging, a generic companion-messaging session (hereinafter "title message session") is implemented. These title message sessions are created on demand when a hosted application successfully connects to a title over the local network 320 or TMF service 340 via the wide area network 330. The TMF sends control and generic messages 332 and 334 between the device 310 and the console 350. Generic messages can include other title specific messages (e.g. touch and gesture events) delivered over the title to hosted application channel or TMF service 340. Generic messages may be title specific messages delivered over the title to hosted application channel or a TMF service 340. Simply, a title message session pairs the title and the hosted application together so that the XLrc 358 and XamLrc 362 can properly route and encrypt messages. A title message session may be initiated in association with a SDP ("Service discovery protocol"). An SDP is a network protocol which allows automatic detection of devices and services offered by these devices on a computer network. The SDP allows the console 350 to advertise a connection on the network and the device 310 to discover the network services of the console 350. Upon the configuration of the network configuration the title messaging session may begin initialization, and using the generic companion-messaging session, titles may send messages to a hosted application running on a specific client after they have received a notification indicating that specific client has connected implying a title message session has been established.

Both the device 310 and the console 350 need to be aware of the transport they employ for communication with one another. The device 310 transport library 318 attempts to establish a local network connection and therefore knows if it was successful. The console 350 is made aware of a local network connection when the device 310 successfully connects and then sends a title message session initialization message (e.g., XLRC_MESSAGE_CONNECT). Regardless, of the transport, the device 310 sends this message to initialize the title message session. Additionally, both the title 352 and the hosted application 316 can determine each devices transport when receiving information about each client.

One embodiment of generic companion-messaging uses reliable, point-to-point message delivery. The underlying transport is TCP for local network 320 connected devices. However, APIs may support unreliable delivery as well as broadcast addressing. Unreliable delivery may be used over UDP for local network 320 connected devices. Titles and hosted applications are expected to be aware that when messages are routed through TMF service 340 that delivery will be implemented using slower, reliable mechanisms. Lastly, broadcast addressing may be supported from the console 350 to all devices. Over reliable transports, this involves sending the message to each device 310 individually over TCP or the TMF service 340 depending on connectivity. Broadcast addressing over unreliable transports may be implemented using UDP multicast and the TMF service for those devices that are not connected directly.

The generic message may take different formats. In one embodiment, the message format supports three headers, one trailer, and several payloads. These message formats may include any additional framing that TMF service 340 adds for messages delivered using its service. The three headers may all share a common set of fields. To support generic companion-messaging a MessageKind (LRC_MESSAGE_KIND_GENERIC) is included in the message library. In one embodiment, the only valid data to be passed for a generic message is a Java Script Object Notation ("JSON") string, indicated with a new MessageType (LRC_MESSAGE_JSON).

Sequence numbers for LRC messages may be kept separately for control messages and generic messages. Simply, they originate in two different libraries on the console 350 and similarly different modules on the device 310. Keeping the sequence numbers separate allow the existing body of code dealing with matching a response with a request to continue to work unchanged.

The generic companion-messaging incorporates secure transport of messages so the console 350, devices 310, and TMF service 340 work together to provide a trustworthy system. From a security standpoint the device 310 is completely un-trusted when communicating with the console 350. The reverse is also true; the console 350 is completely un-trusted when communicating with the device 310. Additionally, it may be assumed that there are compromised devices on the local network 320 that are able to intercept all local network traffic. Service credentials (e.g., user account) are used to authenticate the user. Based on these credentials, a device 310 is allowed to rendezvous with a console 350 when the user on the companion platform is already signed into the console 350.

Given these constraints, traffic to and from the TMF service 340 is over HTTPS. The TMF service 340 may generate all encryption and signing keys. In one embodiment, the TMF service 340 generates a 128-bit HMAC_SHA1 key for signing all messages, ensuring no message has been tampered with. Additionally, the TMF service 340 generates a 128-bit AES key for encrypting all broadcast local network messages as well as per-device initialization messages. All clients (console and devices) receive these session-level signing and encryption keys when joining a session. These keys are changed and redistributed whenever a user on the console 350 signs out. To support per-device privacy, whenever a client joins a session it also receives a 128-bit AES key from the TMF service 340. The console 350 also receives this same key for each device 310 in the session. When a user signs out on the console 350, the keys associated with devices in the session where the same user was signed in are discarded and no longer used. A per-device encryption key allows the same user to sign in on multiple devices.

In an effort to mitigate some of the risk in having un-trusted, opaque data consumed by titles or hosted applications the contents of messages are accessible through a set of hardened function calls. The JSON protocol may be used for all generic message data. On the console 350, this will be exposed to the title developer through the XJSON Parser API. In the alternative, a concatenation of binary fields serialized using an API similar to .NET's BinaryReader may be used. The data size may be set to 1K bytes. Titles are written in such a way that if they are compromised on user's console then they can be revoked.

Remote Process Control

Figure 4:
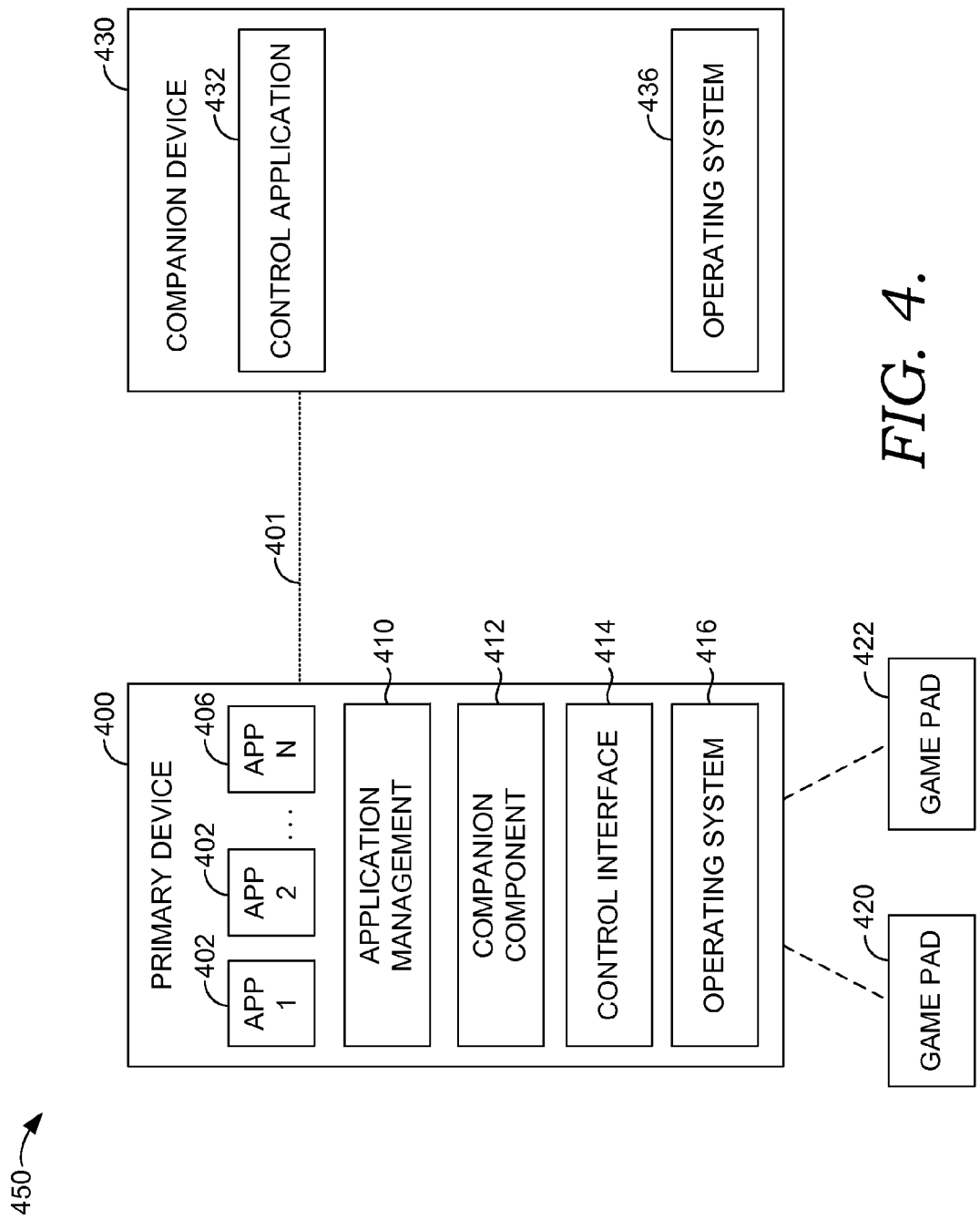
FIG. 4 is a diagram of a computing system architecture for controlling an application running on a primary device using a companion device, in accordance with an embodiment of the present invention.

Turning now to FIG. 4, an exemplary computing environment 450 suitable for use with aspects of the invention is shown, in accordance with an aspect of the present invention. Exemplary computing environment 450 includes a primary device 400 connected to companion device 430 by communication link 401. The communication link 401 may be formed in any manner including those described previously with reference to FIG. 2. The communication link 401 can be wired or wireless, direct or indirect. In one aspect, the communication link occurs over a local area network and the companion device 430 is located within the primary device's presentation area.

The primary device 400 is a computing device having hardware and software suitable for running multiple media applications. Exemplary media applications have been described previously and include applications capable of engaging video games, audio content, audiovisual content, webpages, or other content to generate a media presentation. The primary device includes an operating system 416, a control interface 414, a companion component 412, an application management component 410, a first application 402, a second application 404, and an $n^{th}$ application 406. Aspects of the present invention are not limited to primary devices running three applications. Three applications were selected for use in this example for the sake of simplicity.

The operating system 416 manages hardware resources on the primary device and enables the primary device 400 to run applications.

The control interface 414 receives input from one or more control devices such as a gamepad 420 and a gamepad 422. Other dedicated devices could include a remote control, a keyboard, a mouse, a microphone, and a camera. In one aspect, the camera may be used to provide a gesture interface. In one aspect, the microphone can be used to provide a natural language interface. The control devices may be used to control an application running in the control focus on the primary device 400.

The companion component 412 interacts with the control application 432 on the companion device 430. The companion component 412 generates instructions that are sent to the applications on the primary device. The applications respond to the instructions by changing viewport characteristics according to the instructions. The applications manipulated by the companion component 412 may be out-of-control focus on the primary device 400.

The application management component 410 manages viewports generated by different applications. A viewport may be in the foreground or background. The foreground and background state of a viewport may be changed using controls received by the control interface 414. Additionally or alternatively, the control application 432 may generate instructions to change the foreground/background state of an viewport. A foreground viewport may consume the entire display area available to the primary device when in full screen mode. Alternatively, a foreground viewport may consume less than the entire display area available to the primary device, such as 75% of the available display area, 50% of the available display area, or 25% of the available display area.

The companion device 430 is a computing device having hardware and software capable of generating a control interface for the user and communicating control instructions to the primary device 400. Exemplary companion devices include a tablet and a smartphone. The companion device 430 includes an operating system 436 that manages the companion device's hardware. The companion device 430 and the primary device 400 can run different operating systems. Alternatively, the companion device 430 and the primary device 400 can run the same operating system. The companion device can include a touch screen.

The control application 432 generates an process-management application that presents information about one or more applications running on the primary device and allows the user to change viewport characteristics. The process-management interface can also include virtual play controls that can be used to control an application running on the primary device. The control application 432 can target a different process or application running on the primary device. The targeting defines which application will be controlled by the control application 432 through the companion device 430. The user may switch the control application's targeting from application to application through the process-management interface. The control application 432 may target an application that is in control focus or out-of-control focus on the primary device. As used herein, targeting refers the application being controlled by the control application 432 through the companion device.

Figure 5:
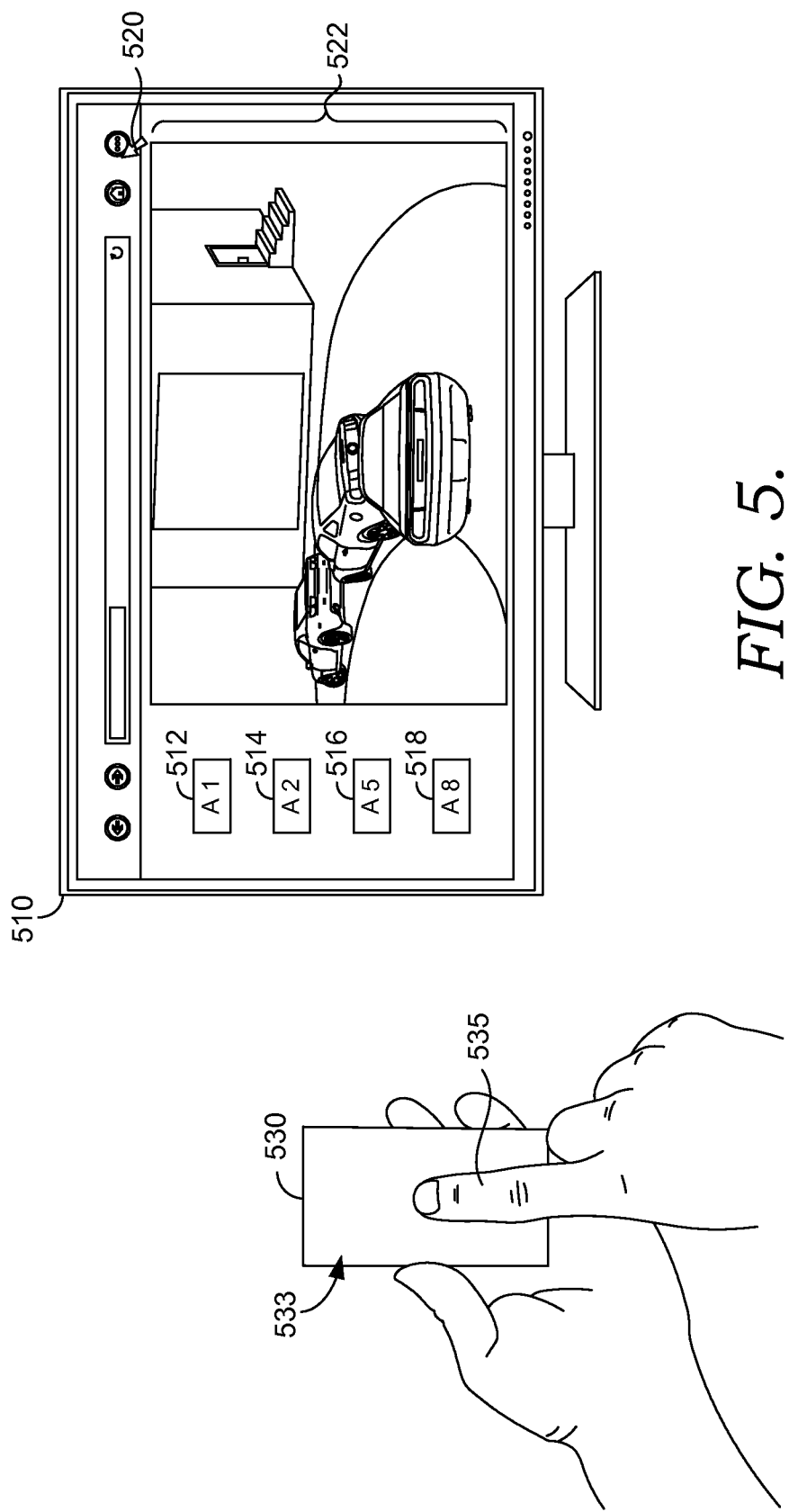
FIG. 5 is a diagram of a person using a companion device to control media applications on a primary device, in accordance with an embodiment of the present invention.

Turning now to FIG. 5, a presentation area 500 is shown, in accordance with an aspect of the present invention. The presentation area 500 includes a primary device 510 and a companion device 530. The primary device 510 is a smart television, in this example, and the companion device 530 is a smartphone. Viewports are visible for five applications running on the primary device 510. The different viewports have different sizes which can be set through the primary device or the companion device. The viewport 522 is generated by a game application, or process, engaged with a driving game title. The viewport 522 is running in fill mode on the primary device. The viewport 522 is in control focus on the primary device because the user is playing the game using a gamepad (not shown).

The A1 application is generating the viewport 512, the A2 application is generating the viewport 514, the A5 application is generating the viewport 516, and the A8 application is generating the viewport A8. The viewports 512, 514, 516, and 518 are all running in snap mode. The snap mode is a minimized state where the interface is reduced in size compared to a viewport in fill or full screen mode. The A1, A2, A5, and A8 processes are running and can be producing content output, such as music or video. The control application on the primary device can control the processes running on the primary device.

A control application running on companion device 530 may generate an interface 533 that the user can interact with using his finger 535. The interface 533 may be used to control one of the applications running in the background without disrupting gameplay or altering the viewport 522.

Figure 6:
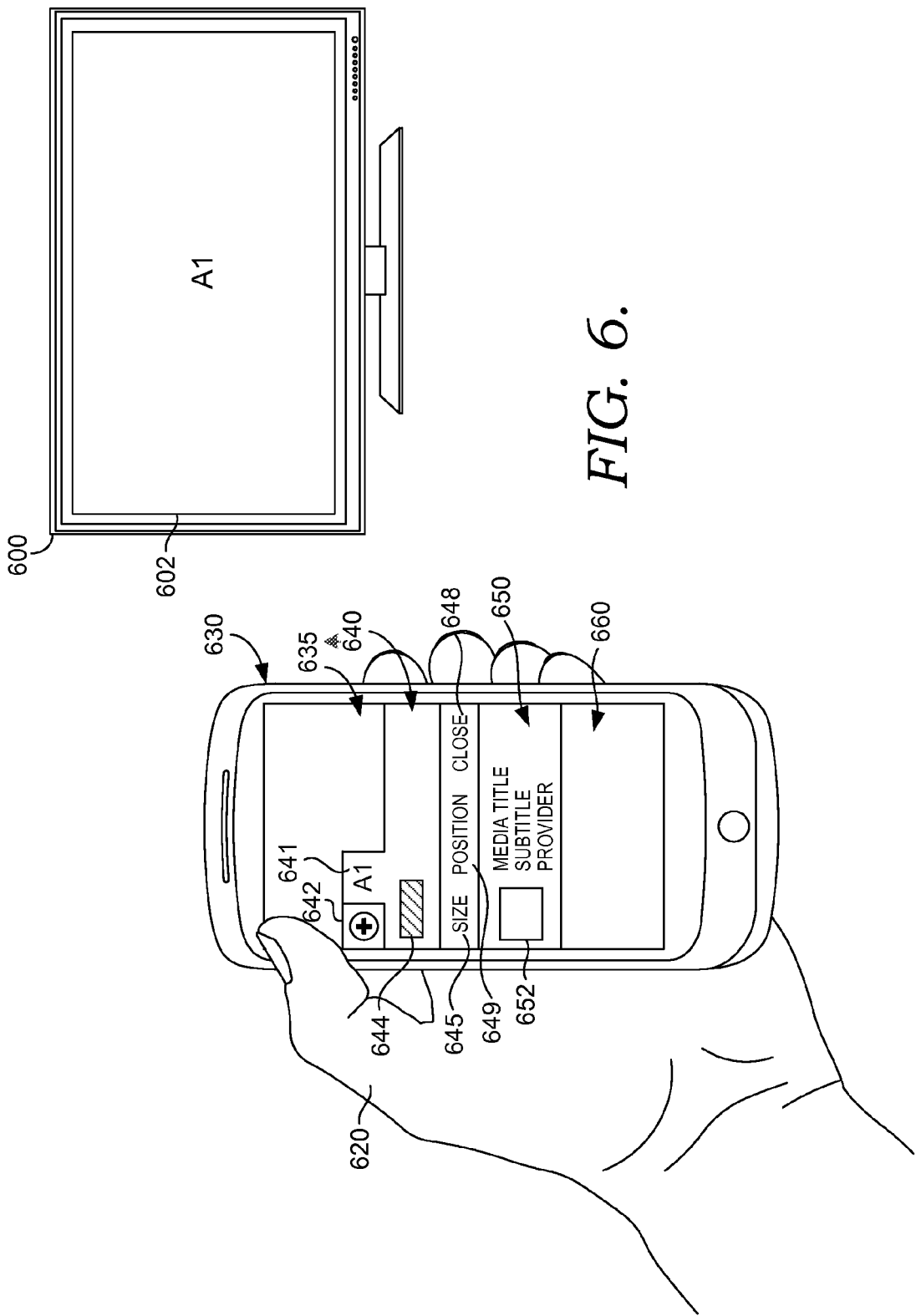
FIG. 6 is a diagram of a companion device showing a process-management interface that can control viewports for active applications on a primary device, in accordance with an embodiment of the present invention.

Turning now to FIG. 6, a process-management interface is illustrated, in accordance with an aspect of the present invention. User 620 is holding the companion device 630 in his hand. In one aspect, the user may interact with the primary device while in the primary device's presentation area. The control application allows a companion device 630 to control characteristics of one or more applications running on a primary device 600. In the example shown in FIG. 6, the companion device 630 is a smartphone and the primary device 600 is a smart television. A smart television includes computing hardware suitable to run media applications. The primary device could be a computing device that does not have an integrated display. For example, the primary device could be a game console, a set top box, or a DVD player. When the primary device does not have an integrated display, then the interface generated by the primary device may be output to a display, such as a television. Whether integrated or separate, any display associated with the primary device can be described herein as the primary device's display. An interface may be described as "displayed on the primary device" when the interface is displayed on a separate display associated with the primary device.

Interfaces generated by an application can have viewports of varying sizes. For example, a viewport could consume the full screen, half a screen, or some other designated portion of a screen. In a special case, a fill mode is provided where the viewport consumes all of the available screen except a portion dedicated to other viewports in a minimized mode. In FIG. 6, the viewport of the first application 602 is in full-screen mode.

A process-management interface 635 is presented on the companion device 630. The process-management interface 635 may be generated by a control application running on the companion device. The process-management interface 635 includes a viewport-management interface 640, a media details section 650, and an indirect control area 660. The control application communicates with the primary device to receive state information for applications running on the primary device. The control application also generates control instructions for the primary device to follow. The viewport-management interface 640 allows the user to control viewport characteristics for one or more applications. It should be understood that an application running on a device may generate a dedicated user interface. As mentioned, the screen real estate consumed by the dedicated interface is described as the application's viewport.

Process-management interface 635 has an application targeted for control. The targeting designates an application to be controlled by the process-management interface. When only a single application is running on the primary device, then the single running application is targeted. When multiple applications are running on the primary device, then the user may select a single application for the control application to an using open application tab 642 or the tab 641. The tab 641 is selected in FIG. 6, causing the first application, designated A1, to be targeted. All of the controls and features in the process-management interface 635 are related to the targeted application. The controls will control the targeted application. Application and media details describe the targeted application. As the targeted application is changed, the process-management interface is automatically updated for the new application.

Figure 12:
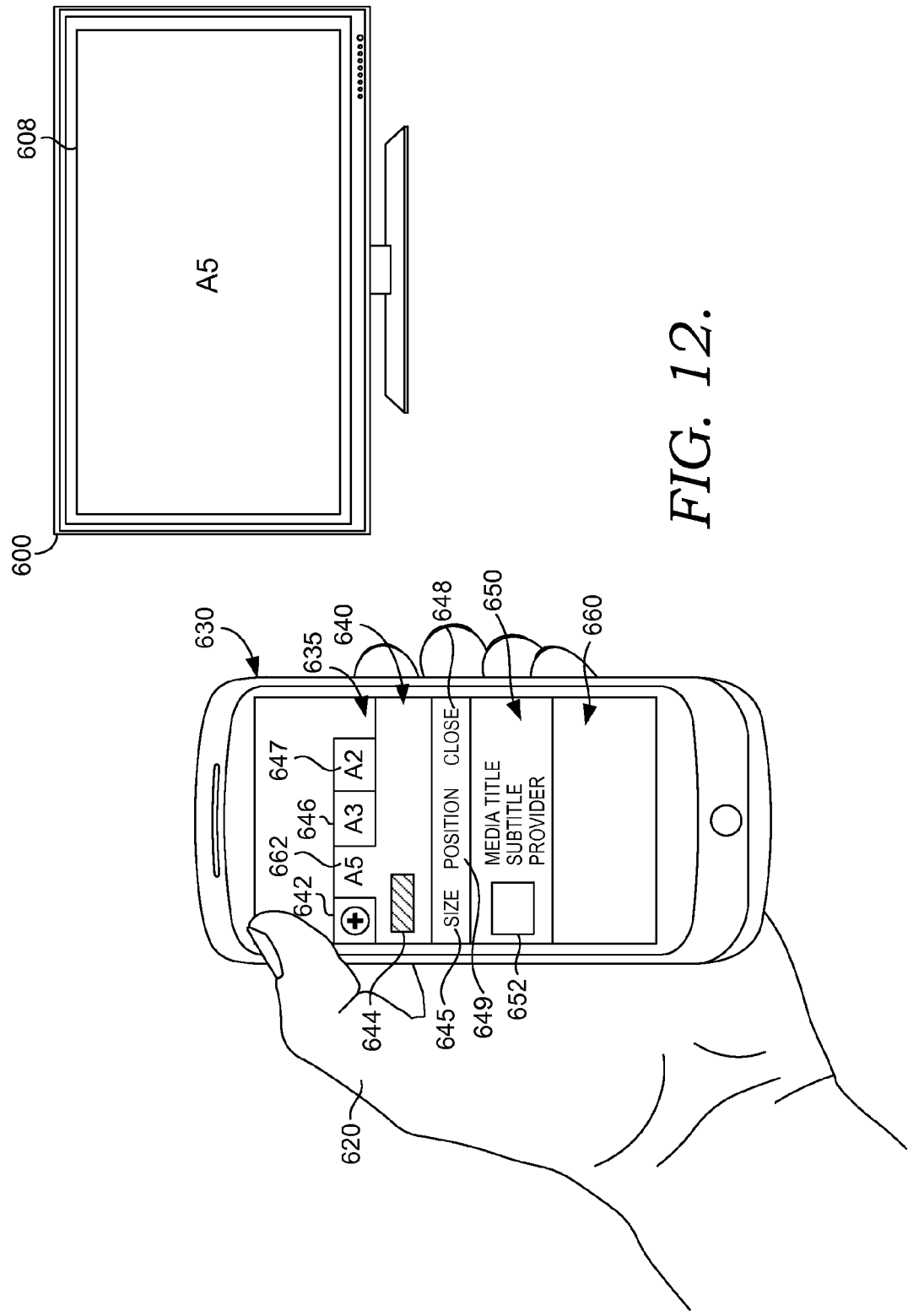
FIG. 12 is a diagram of an process-management interface showing details of a newly opened application, in accordance with an embodiment of the present invention.

Tab 642 can generate an interface that allows the user to open an application on the primary device. The opening interface is illustrated with reference to FIG. 12.

The viewport-management interface 640 allows the user to manipulate the viewport of an application in several different ways. The size control 645 allows the user to change the size of the viewport on the primary device's display. In one aspect, the user is able to choose from one of several different default sizes. Available default sizes could include full screen, fill screen, half screen, quarter screen, quarter-screen right, quarter-screen left, quarter-screen top, quarter-screen bottom, and such. Quarter-screen top allocates a quarter of the available display to the application's viewport and orients the viewport along the top of the screen. The right quarter, left quarter, and bottom quarter work in a similar fashion to orient the quarter-sized viewport along the right, left, or bottom portions of the screens, respectively. In one aspect, the user is provided with an interface to precisely set the viewport dimensions by unit of measure such as inches, pixels, or centimeters. For example, the user could set the viewport to 4×6 inches. The custom dimensions may be constrained to an aspect ratio specified for an application's viewport.

The size indication 644 provides feedback indicating the viewport's current size. In this example, the hash marks indicate to the user that the viewport is in full-screen mode. In one aspect, the size control provides an indication mapping to the orientation and size of the viewport within the application.

The position control 649 allows the user to change the position of a viewport associated with the targeted application. In one aspect, the user can drag the viewport to a new location using a virtual touchpad in the control area 660. In another aspect, the user can snap the viewport right or left. Snapping the viewport causes the viewport to aligned with an edge of the display.

The close control 648 may close an application running on the primary device. In one aspect, the close control 648 is only usable with applications running in background mode on the primary device.

In one aspect, the process-management interface 635 includes a media details section 650. The media details section 650 describes a media engaged by a targeted application. For example, the media details section 650 could describe a song being played by an audio player running on the primary device. Relevant media details could include the media title, a subtitle, and a provider. When available, the media details could also include cover art 652.

In one aspect, the process-management interface 635 includes a control area 660. The control area 660 may include a plurality of contextual controls suitable for controlling functions of the application presently being targeted by the control application.

Figure 7:
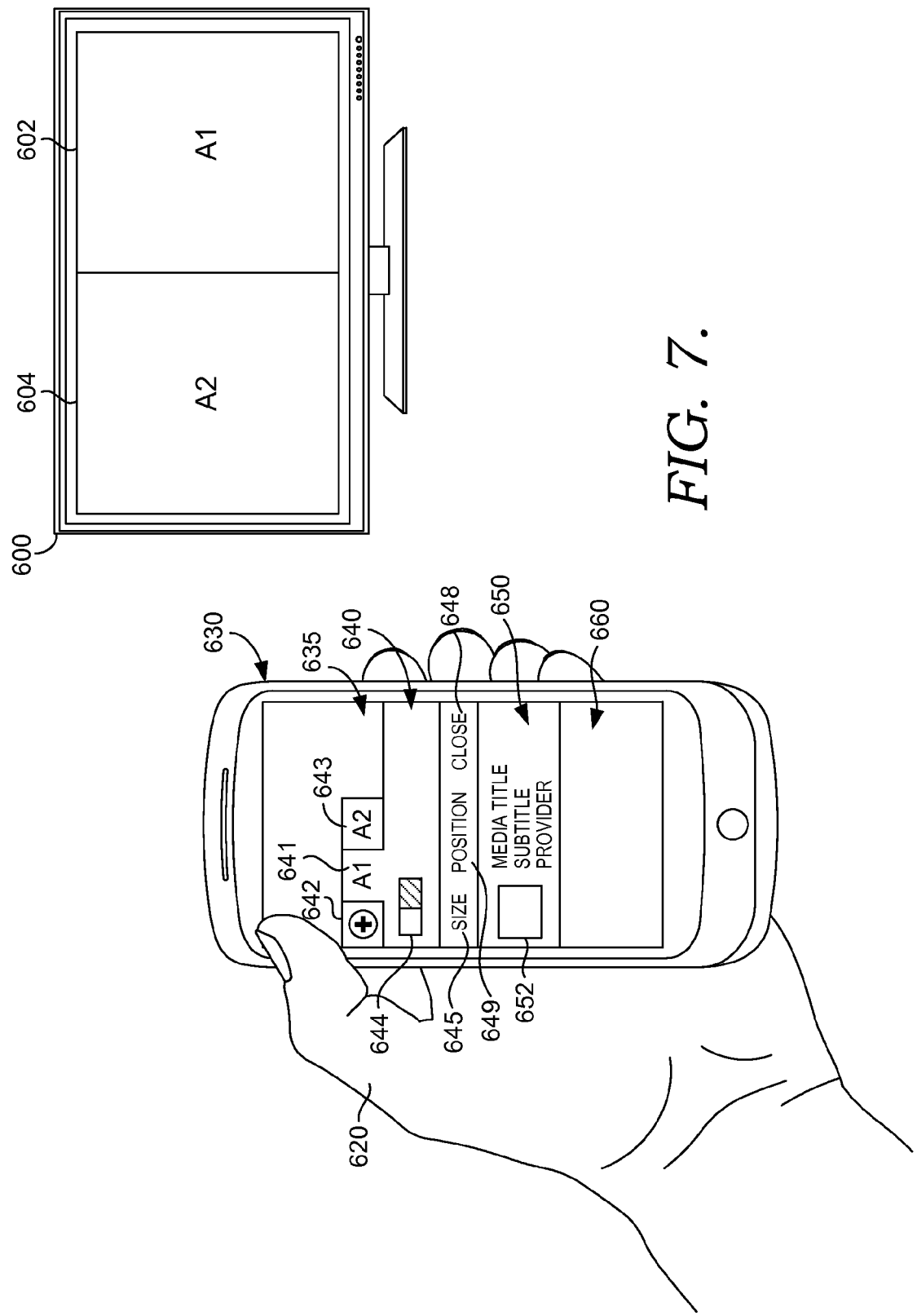
FIG. 7 is a diagram of a process-management interface setting an application's viewport size to half screen, in accordance with an embodiment of the present invention.

Turning now to FIG. 7, the use of a viewport-management interface 640 to change a viewport size to half size is illustrated, in accordance with an aspect of the present invention. In FIG. 7, the size control 645 has been used to change the size of the first application's viewport 602 to half screen. Upon receiving a user interaction specifying the new size, a control instruction specifying the new size is communicated from the companion device 630 to the primary device 600. The new size of the viewport 602 reveals a second application's viewport 604 associated with a second application. The appearance of the size indication 644 has changed to communicate the new size of the viewport associated with the first application.

Tab 643 may be selected if the user wishes to target the second application. The first application remains targeted in FIG. 7 as indicated by active tab 641.

Figure 8:
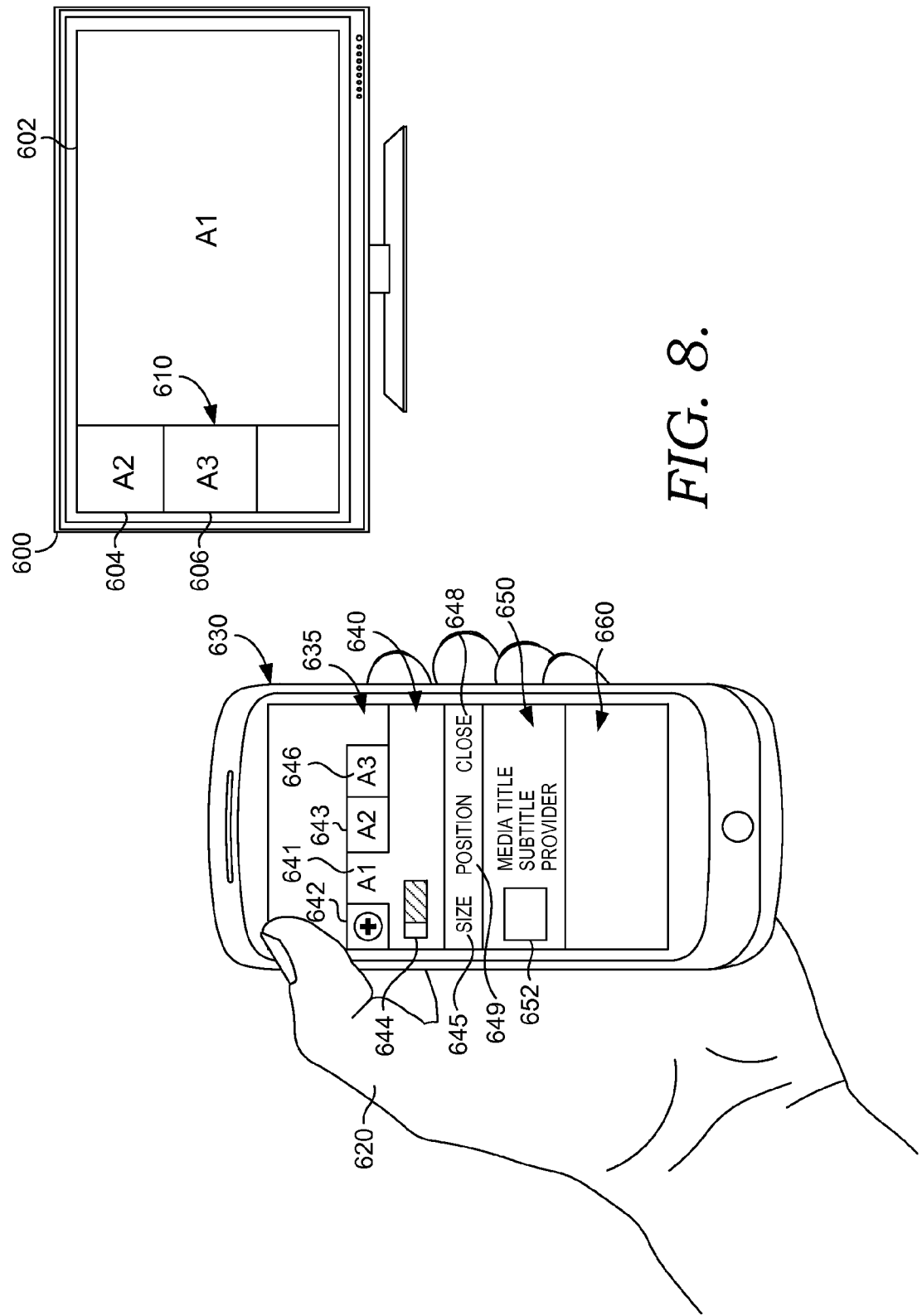
FIG. 8 is a diagram of a process-management interface setting an application's viewport size to fill mode, in accordance with an embodiment of the present invention.

Turning now to FIG. 8, a use of a viewport-management interface 640 to change a viewport size to fill mode is illustrated, in accordance with an aspect of the present invention. The user has changed the viewport size from half screen in FIG. 7 to fill mode using size control 645 in the viewport-management interface 640. Upon receiving a user interaction specifying the new size, a control instruction specifying the new size is communicated from the companion device 630 to the primary device 600. As mentioned, fill mode causes the viewport 602 to fill all portions of the screen except those allocated to a utility bar 610. In this case, the utility bar 610 includes snapped viewports 604 and 606. Viewport 604 is associated with the second application, while viewport 606 is associated with the third application. The viewports may show content generated from media engaged by those applications. The new size of the first application's viewport 602 is indicated by the change in the appearance of size indication 644.

Tab 643 may be selected if the user wishes to target the second application. Tab 646 may be selected if the user wishes to target the third application. The first application remains targeted in FIG. 8 as indicated by active tab 641.

Figure 9:
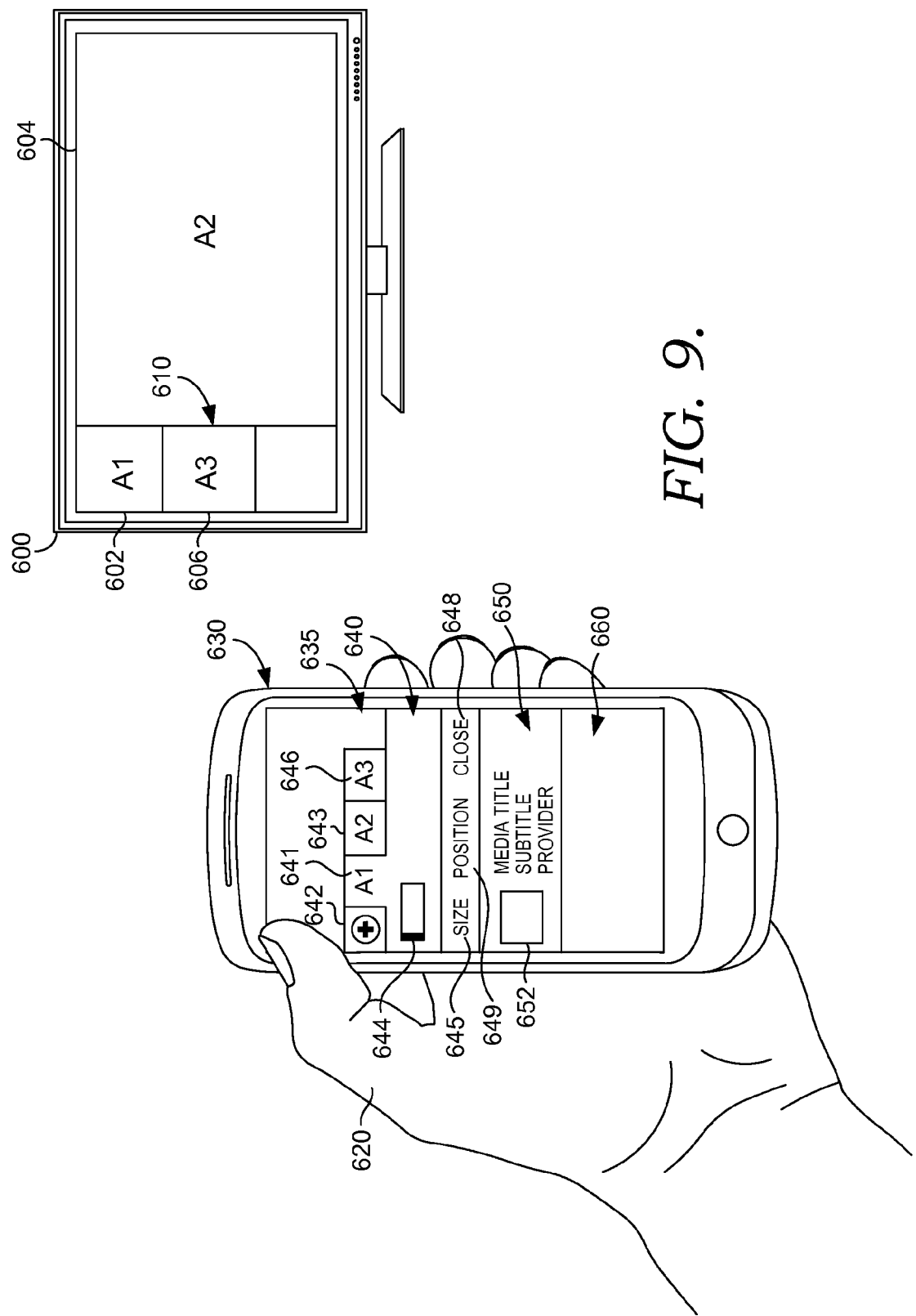
FIG. 9 is a diagram of a process-management interface changing an application's control focus on a companion device, in accordance with an embodiment of the present invention.

Turning now to FIG. 9, using a viewport-management interface 640 to change viewport position is illustrated, in accordance with an aspect of the present invention. The use has changed a position on the first application's viewport 602 from foreground to left snap using the position control 649. Upon receiving a user interaction specifying the new position, a control instruction specifying the position is communicated from the companion device 630 to the primary device 600. The primary device 600 may provide confirmation.

Additionally, the size of the first application's viewport 602 has changed to a reduced size as a result of input provided through the size control 645 changing the size of the viewport 602 to snapped. Upon receiving a user interaction specifying the new size, a control instruction specifying the new size is communicated from the companion device 630 to the primary device 600. The appearance of size indication 644 has changed to reflect the new size.

Figure 10:
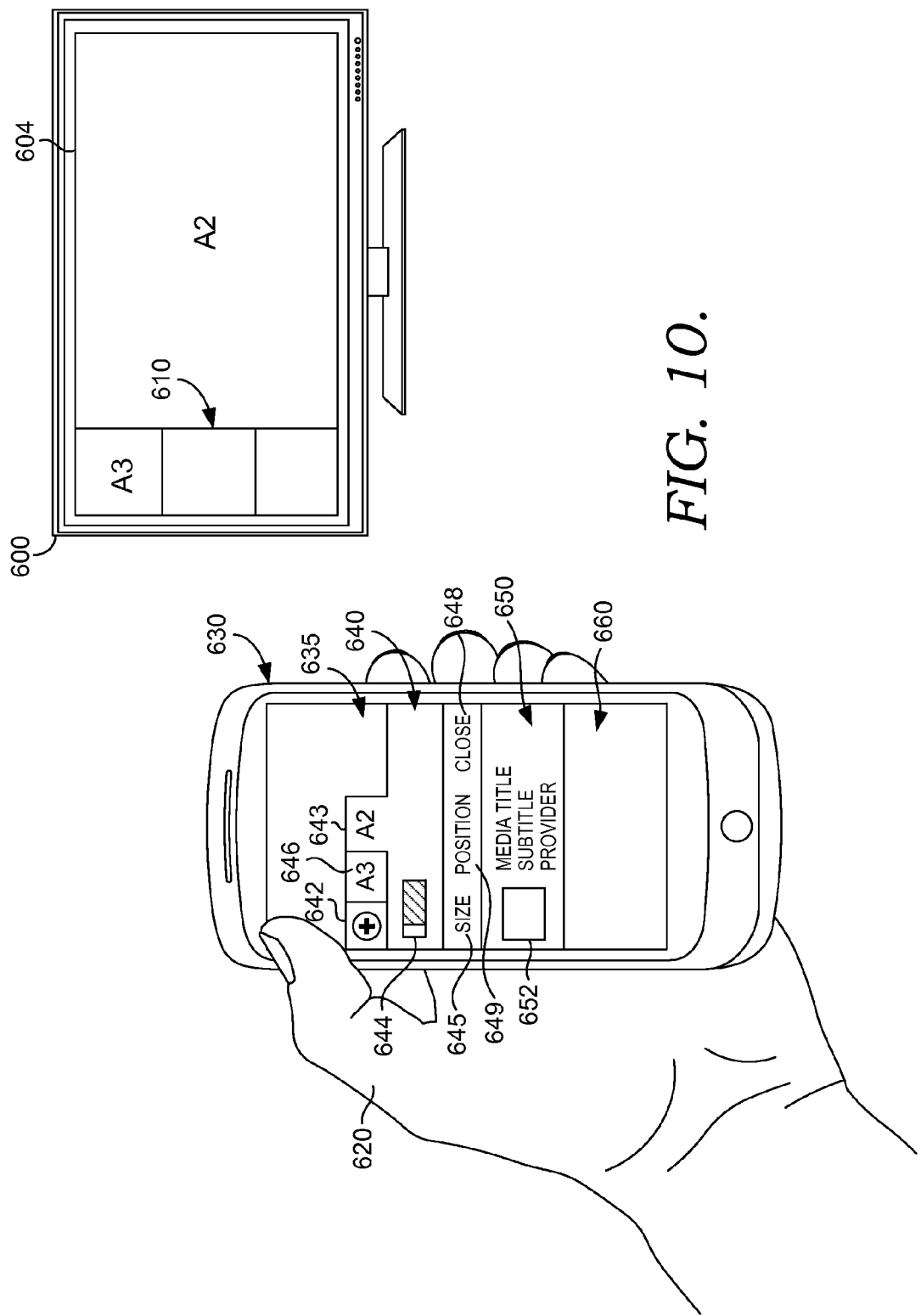
FIG. 10 is a diagram of a process-management interface closing an application running on a companion device, in accordance with an embodiment of the present invention.

Turning now to FIG. 10, the use of a viewport management application to close an application on the primary device is illustrated, in accordance with an aspect of the present invention. The close control 648 has been used to close the first application. Upon receiving a user instruction to close an application, a control instruction is communicated from the companion device 630 to the primary device 600. The primary device 600 then closes the first application and removes the first application's viewport 602 from the display, as illustrated by the absence of the viewport 602.

When an application is closed through the viewport-management interface 640, the targeting of the viewport-management interface 640 may automatically change to a different application, such as the application in foreground mode on the primary device. In this example, the targeting on the viewport-management interface has changed to the second application as indicated by active status of the tab 643. The user may then choose a different application for control focus as described previously. The tab 641 associated with the first application has been removed from the available tabs as a result of the first application closing on the primary device. As mentioned, the tabs can all correspond to application running on the primary device.

Figure 11:
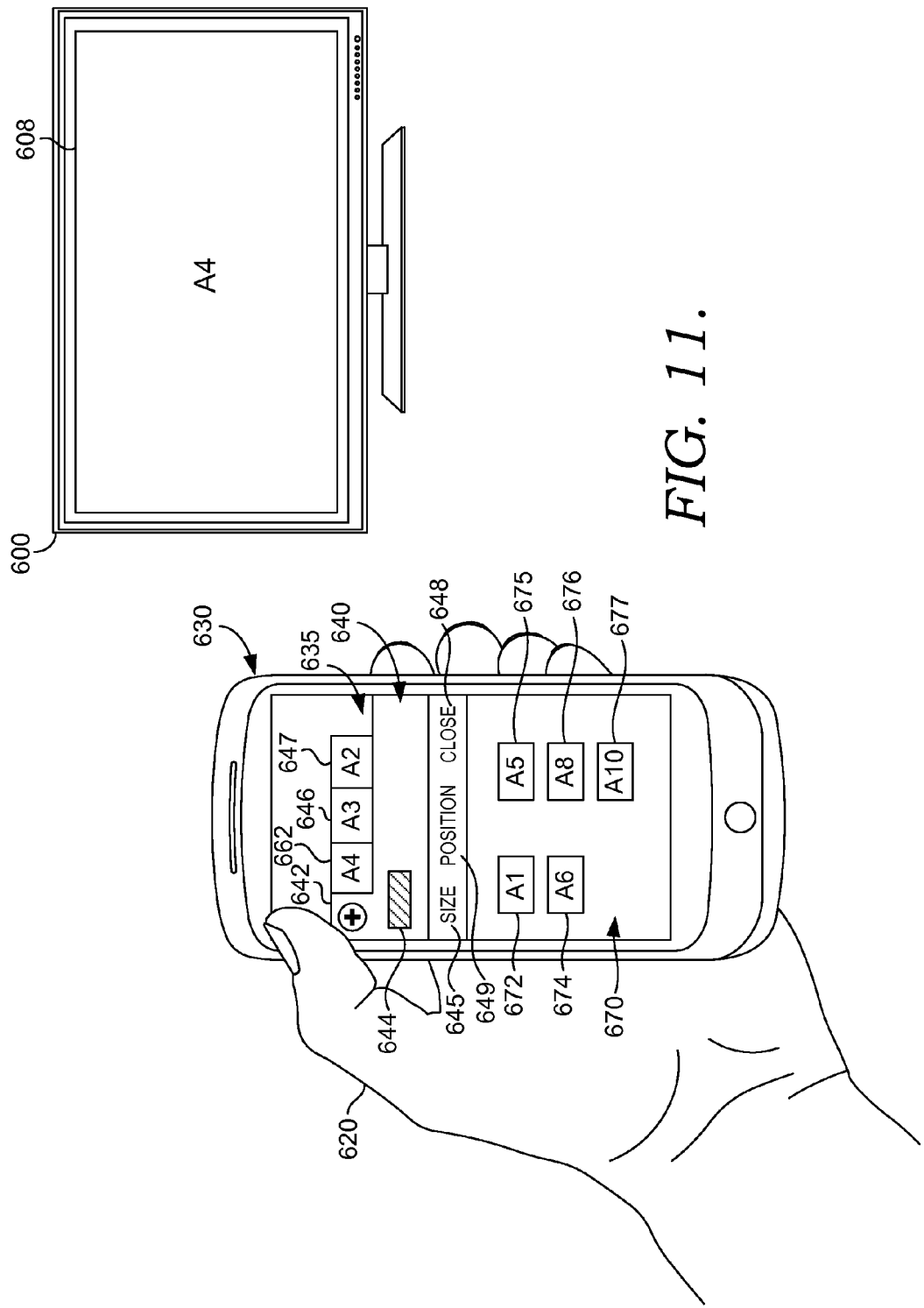
FIG. 11 is a diagram of an open-application interface, in accordance with an embodiment of the present invention.

Turning now to FIG. 11, the use of a viewport management application to open an application on the primary device is illustrated, in accordance with an aspect of the present invention. The open application tab 642 may be used to activate an open-application interface 670 that lists applications not currently running on the primary device that are able to be opened by the control application. The listed applications may be shown as tiles or icons. Tile 672 corresponds to the first application, tile 674 corresponds to the sixth application, tile 675 corresponds to the fifth application, tile 676 corresponds to the eight application, and tile 677 corresponds to the tenth application. In this example, the user selects the tile 675 to open the fifth application. The user can set the initial size through size control 645 and the initial position through the position control 649. Once the viewport characteristics for the new application are set, an instruction is communicated to the primary device to open the fifth application, place the control focus on the fifth application, and set the viewport for the fifth application to full screen. In response, the fifth application's viewport 608 is opened in full-screen mode. The fifth application also may automatically be targeted as indicated by the activation of the tab 662 in FIG. 12.

Figure 13:
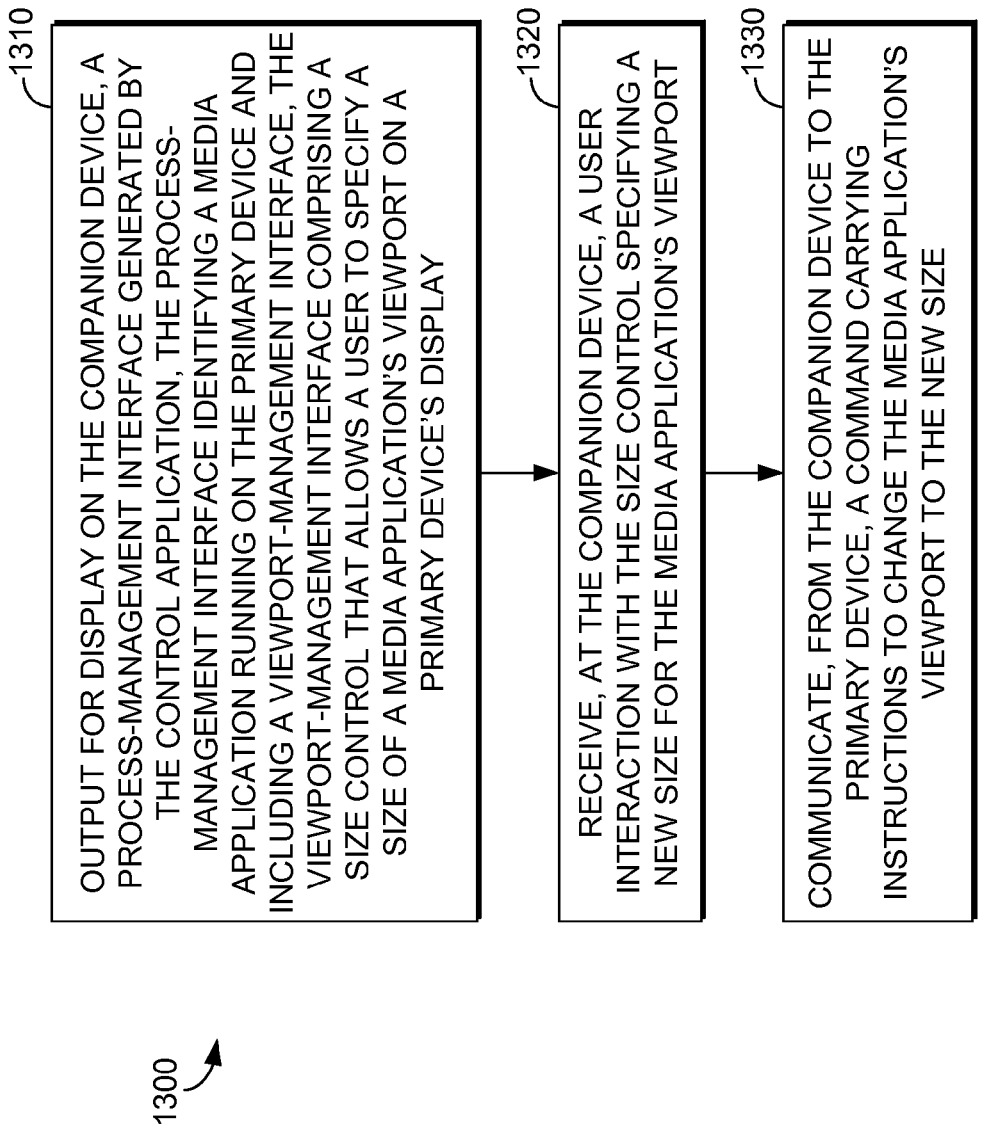
FIG. 13 is a flow chart showing a method of using a companion device to control a process running on a primary device, in accordance with an embodiment of the present invention.

Turning now to FIG. 13, a method 1300 of using a companion device to control a process running on a primary device is provided, in accordance with an aspect of the present invention. The primary device could be a game console, set top box, smart TV, or such. The companion device could be selected from a group consisting of a tablet, a laptop, a PC, or a smartphone. The primary device can use a direct focus model that requires the control focus of the primary device to be on an application for the user to interact with the application through the primary device.

At step 1310, a process-management interface that identifies a media application running on the primary device is output for display on the companion device. The process-management interface includes a viewport-management interface. The viewport-management interface comprises a size control that allows a user to specify a size of a media application's viewport on a primary device's display. The size control may be a touch sensitive icon. Touching the size control may open an interface through which one of several available sizes could be selected. Possible viewport sizes include full screen, half screen, and minimized. In one aspect, the size control allows the user to specify dimensions for the viewport. The viewport-management interface may also include a position control to move the viewport.

In one aspect, the viewport-management interface includes a size indication that changes appearance to reflect the current size of a viewport on the primary device. The size indication can have a shape similar to the shape of the display associated with the primary device. For example, the size indication could be shaped as a rectangle with an aspect ratio similar to the aspect ratio on a display used by the primary device. To indicate the current size of a viewport, a portion of the size indication could be shaded, colored, or otherwise distinguished from the rest of the size indication. The portion of the size indication can correspond to the size of the viewport, thereby communicating a current size of a viewport. Communicating the size of the viewport can be especially helpful when the viewport is not visible on the primary device's display because another application's viewport is in full screen mode or is otherwise obstructing the viewport.

In one aspect, the viewport-management interface includes a focus control that allows a user to change a control focus of the primary device from the media application to a different media application. As mentioned, the direct control model used by the primary device allows it to focus on only one application at a time period. The control focus may be set through the primary device by selecting an application. The viewport-management interface provides a second mechanism for setting the control focus on the primary device.

In one aspect, the focus control may have an appearance that indicates whether an application is currently in focus or out of focus on the primary device. The focus control can also be used to set the initial control focus of an application that is opened through the viewport management interface.

In one aspect, the process-management interface includes a close control that allows the user to close the media application running on the primary device. In one aspect, the process-management interface is limited to closing media applications out-of-control focus on the primary device. In this way, applications may be closed on the primary device without interrupting a viewport associated with an application in foreground mode.

In one aspect, the viewport-management interface includes an application selection control that allows the user to target a different application with the control application. In one aspect, applications running on the primary device that are able to be controlled by the companion device may be selected.

In another aspect, applications installed on the primary device, including those that are not running, may be selected through an open-application interface. When an application that is not running is selected, the user may specify initial viewport settings through a viewport-management interface. The user may simultaneously set the control focus and the size of the viewport for the newly opened application.

At step 1320, at the companion device, a user interaction with the size control specifying a new size for the media application's viewport is received. The size control may be a touch sensitive icon, in which case the interaction is a touch. Touching the size control may open and interface through which one of several available sizes could be selected. Possible viewport sizes include full screen, half screen, and minimized. In one aspect, the size control allows the user to specify dimensions for the viewport.

At step 1330, a viewport-management command is communicated from the companion device to the primary device carrying instructions to change the media application's viewport to the new size. The instruction may be sent over a wired or wireless connection between the primary device and the companion device. Exemplary connections have been described previously with reference to FIG. 2. Upon receiving the instruction, the primary device can update the viewport according to the instruction.

Figure 14:
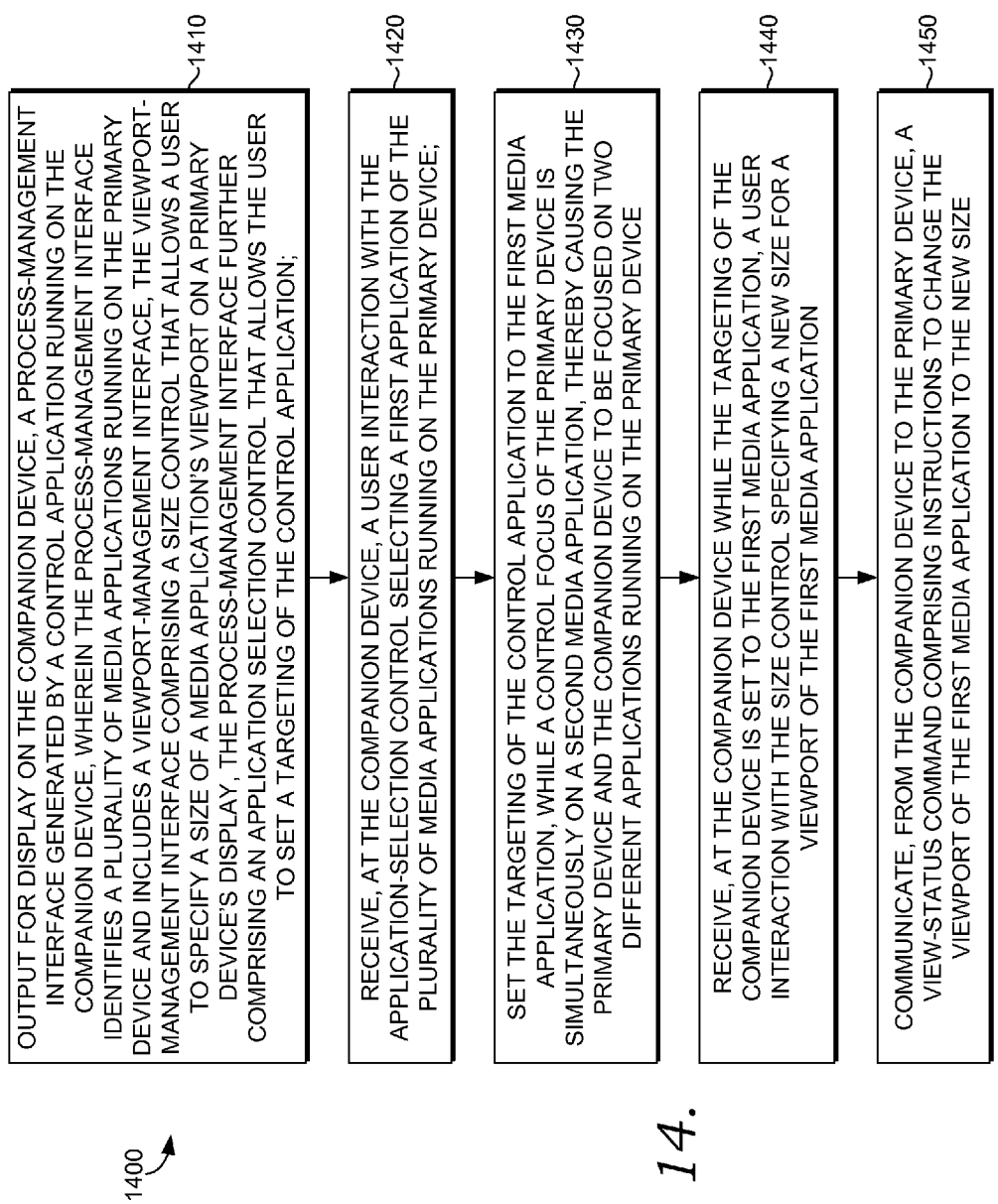
FIG. 14 is a flow chart showing a method of using a companion device to control a process running on a primary device, in accordance with an embodiment of the present invention.

Turning now to FIG. 14, a method 1400 of using a companion device to control an application running on a primary device is provided, in accordance with an aspect of the present invention. The primary device can use a direct focus model that requires the control focus of the primary device to be on an application for the user to interact with the application through the primary device.

At step 1410 a process-management interface that identifies a plurality of media applications running on the primary device is output for display on the companion device. The process-management interface can include a viewport-management interface. The viewport-management interface comprises a size control that allows a user to specify a size of a media application's viewport on a primary device's display. The process-management interface can further comprise an application selection control that allows the user to set the control application's targeting on the companion device.

At step 1420, at the companion device, a user interaction with the application-selection control selecting a first application of the plurality of media applications running on the primary device is received. In one aspect, the application-selection control is a tabbed interface with each available application associated with an individual tab. The tabs may be evenly spaced across the interface. In one aspect, the appearance of the tab associated with a currently selected application can be distinguished from the other tabs. For example, a tab or a portion of the tab could be highlighted, underlined, or otherwise distinguished from the other tabs.

At step 1430, setting the targeting of the control application on the first application at the time when a control focus of the primary device is simultaneously on a second media application. In aspects of the invention, the primary device and the companion device can be focused on two different applications running on the primary device. This allows the user to control an application in the background without disrupting the foreground application on the primary device.

At step 1440, at the companion device, while the control focus of the companion device is set to the first media application, a user interaction with the size control specifying a new size for a viewport of the first media application is received. In one aspect, the size control allows the size to be selected from a group consisting of full screen, half screen, and minimized.

At step 1450, a viewport-management command comprising instructions to change the viewport of the first media application to the new size is communicated from the companion device to the primary device.

In addition to the viewport management controls, information about a media engaged by application may be displayed on the process-management interface. For example, a media detail interface that identifies the media title engaged by the first media application could be displayed. The media information may be provided by the primary device, for example, in a state message the primary device communicates to the companion device.

Figure 15:
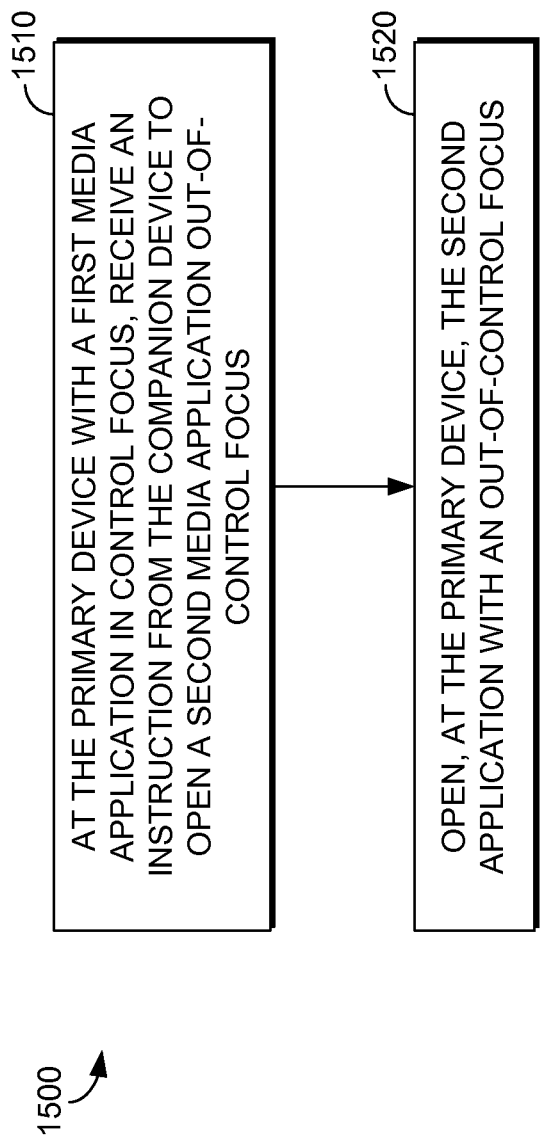
FIG. 15 is a flow chart showing a method of using a companion device to control a process running on a primary device, in accordance with an embodiment of the present invention.

Turning now to FIG. 15, a method 1500 of using a companion device to control a media application running on a primary device is provided, in accordance with an aspect of the present invention. The method 1500 may be performed by the primary device. The primary device can use a direct focus model that requires the control focus of the primary device to be on an application for the user to interact with the application through the primary device.

At step 1510, at the primary device with a first media application running in a foreground mode, an instruction is received from the companion device to open a second application with an out-of-control focus. The instruction could be generated in response to a user's interaction with an application-management interface. The instruction could also specify the size and/or position of the viewport to be opened.

At step 1520, at the primary device, the second application is opened with an out-of-focus control in response to the instruction. If the response designates a viewport size, then the second application's viewport is opened with the instructed size.

Aspects of the invention, include receiving an instruction to close an application. In response to a close instruction, the primary device will close a running application. Additional instructions include changing the size of a viewport or position. In response to an instruction to change a viewport size, the primary device will change the designated viewport to the designated size.

Embodiments of the invention have been described to be illustrative. It will be understood that certain features and subcombinations are of utility and may be employed without reference to other features and subcombinations. This is contemplated by and is within the scope of the claims.

The invention claimed is:

1. A method of using a control application on a mobile companion device to control a process running on a primary device, the method comprising:
    outputting for display on the mobile companion device a process-management interface generated by the control application, the process-management interface identifying a plurality of media applications running on the primary device and including a viewport-management interface, the viewport-management interface comprising a size control that allows a user to specify a size of a media application's viewport on a primary device's display, the process-management interface further comprising an application selection control that allows the user to set a targeting of the control application to one of multiple media applications running on the primary device;
    receiving, at the mobile companion device, a user interaction with the application-selection control selecting a first application of the plurality of media applications running on the primary device to target;
    setting the targeting of the control application to a first media application, while a control focus of the primary device is simultaneously on a second media application, thereby causing the primary device and the mobile companion device to be focused on two different applications running on the primary device, wherein the control focus being at least the primary device controlling the application running on the primary device and the out-of-control focus being at least the application running on the primary device, but the application not receiving active user interactions through the primary device;
    receiving, at the mobile companion device, a user interaction with the size control specifying a new size for the first media application's viewport; and
    communicating, from the mobile companion device to the primary device, a command carrying instructions to change the first media application's viewport to the new size.

2. The method of claim 1, wherein the size control allows the size to be selected from a group consisting of full screen, half screen, and minimized.

3. The method of claim 1, wherein the process-management interface further comprises a targeting control that allows a user to change the control application's targeting from the first media application to a different media application.

4. The method of claim 1, wherein the process-management interface further comprises a close control that allows the user to close the first media application running on the primary device.

5. The method of claim 1, wherein the viewport-management interface further comprises a position control that allows the user to change a position of the media application's viewport.

6. The method of claim 1, wherein the process-management interface further comprises an open control that allows the user to open a new application while simultaneously setting the view size.

7. The method of claim 1, wherein the primary device is a game console and the mobile companion device is selected from a group consisting of a tablet or a smartphone.

8. One or more computer hardware storage media comprising computer-executable instructions embodied thereon that, when executed by a computing device, perform a method of using a mobile companion device to control a viewport of a media application running on a primary device, the method comprising:
    outputting for display on the mobile companion device, a process-management interface generated by a control application running on the mobile companion device, wherein the process-management interface identifies a plurality of media applications running on the primary device and includes a viewport-management interface, the viewport-management interface comprising a size control that allows a user to specify a size of a media application's viewport on a primary device's display, the process-management interface further comprising an application selection control that allows the user to set a targeting of the control application to one of multiple media applications running on the primary device;
    receiving, at the mobile companion device, a user interaction with the application-selection control selecting a first application of the plurality of media applications running on the primary device to target;
    setting the targeting of the control application to a first media application, while a control focus of the primary device is simultaneously on a second media application, thereby causing the primary device and the mobile companion device to be focused on two different applications running on the primary device, wherein the control focus being at least the primary device controlling the application running on the primary device and the out-of-control focus being at least the application running on the primary device, but the application not receiving active user interactions through the primary device;
    receiving, at the mobile companion device while the targeting of the mobile companion device is set to the first media application, a user interaction with the size control specifying a new size for a viewport of the first media application; and communicating, from the mobile companion device to the primary device, a viewport-management command comprising instructions to change the viewport of the first media application to the new size.

9. The media of claim 8, wherein the primary device uses a direct focus model that requires the control focus of the primary device to be on an application for the user to interact with the application.

10. The media of claim 8, wherein the method further comprises receiving a state message from the primary device that identifies the plurality of media applications, including the first media application and the second media application, presently running on the primary device.

11. The media of claim 8, wherein the method further comprises receiving a state message from the primary device that identifies a media title with which the first media application is engaged.

12. The media of claim 11, wherein the method further comprises:
outputting for display on the mobile companion device a media detail interface that identifies the media title engaged by the first media application.

13. The media of claim 8, wherein the size control allows the size to be selected from a group consisting of full screen, half screen, and minimized.

14. The media of claim 8, wherein the method further comprises:
receiving a user interaction with a close control on the process-management interface; and
communicating, from the mobile companion device to the primary device, a close instruction that instructs the primary device to close the first media application.

15. The media of claim 8, wherein the method further comprises:
receiving a user interaction identifying a third media application that is not presently running on the primary device;
receiving a user interaction with a control status control on the process-management interface, the user interaction specifying a control status of the third application to out-of-control focus; and
communicating, from the mobile companion device to the primary device, an open instruction that instructs the primary device to open the third media application out-of-control focus.

* * * * *